Sept. 19, 1967   H. L. ERICKSON ET AL   3,342,452
VENDING MACHINE VALVES
Filed April 3, 1964
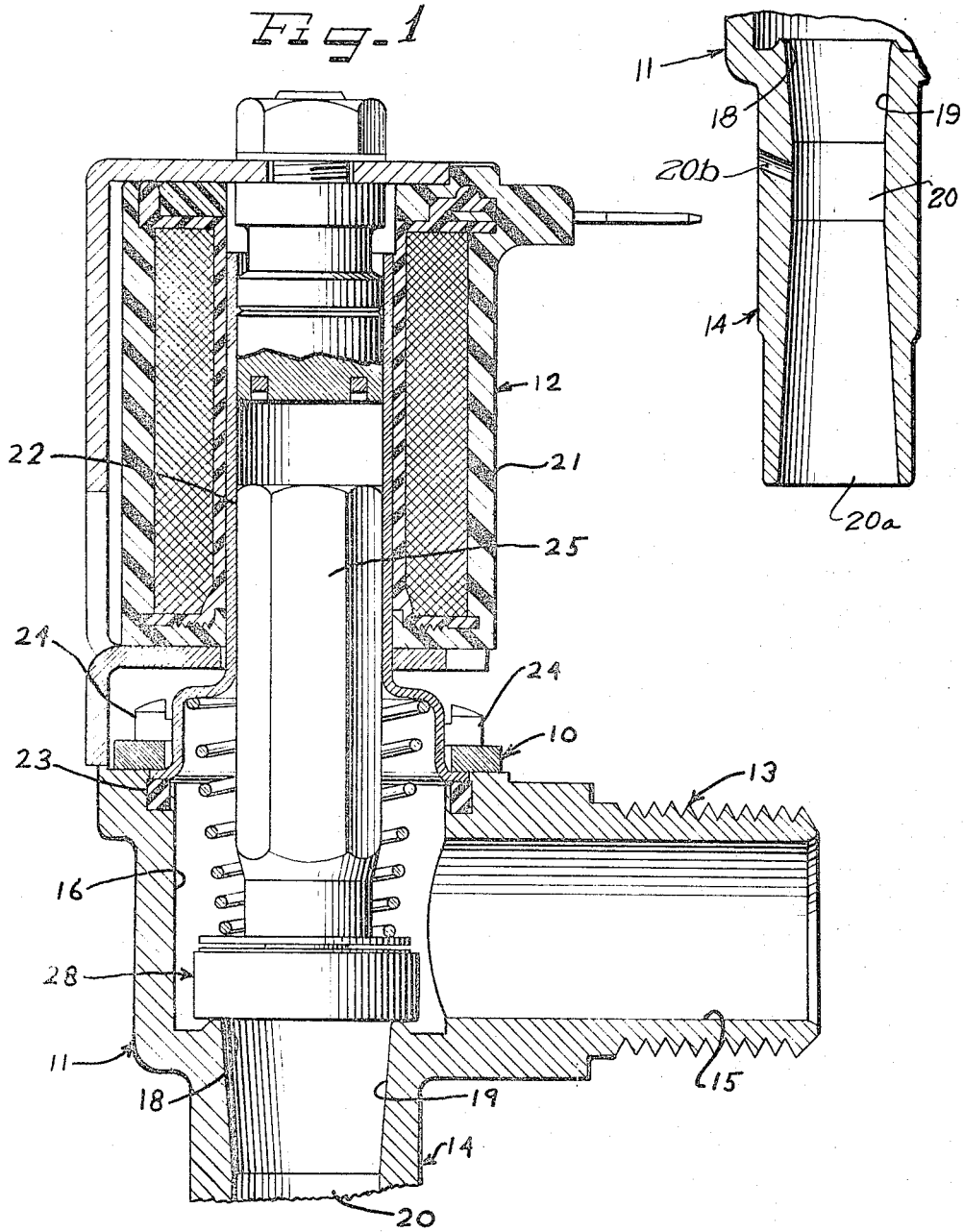
INVENTORS
*Howard L. Erickson*
BY *William G. Huley*
ATTORNEYS

United States Patent Office 3,342,452
Patented Sept. 19, 1967

3,342,452
VENDING MACHINE VALVES
Howard L. Erickson, Bensenville, and William G. Huley, Palatine, Ill., assignors to The Dole Valve Company, Morton Grove, Ill., a corporation of Illinois
Filed Apr. 3, 1964, Ser. No. 357,163
3 Claims. (Cl. 251—118)

This invention relates to high capacity liquid flow control or shutoff valves and more particularly relates to gravity feed valves designed to have a high flow rate and long trouble-free operation.

Briefly characterized, the invention contemplates a valve body having an inlet passage communicable with a gravity fed source of liquid, a venturi-contoured outlet passage leading to a point of utilization and an annular knife-edged flow port formed integrally with the valve body and defining a flow port intermediate the inlet and outlet passages and through which liquid must flow in passing from the former to the latter. A converging walled flow passage leads from the flow port and converges to the relatively smaller diameter outlet passage which, in turn, diverges through the outlet nipple to provide a high flow rate capacity. A solenoid actuable poppet valve member is cooperable with the knife-edged rim to control the flow of liquid through the port.

The converging wall configuration of the flow passage leading from the knife-edged rim to the outlet passage and the diverging outlet passage prevents liquid from breaking away from the wall of the passage as it travels to and through the outlet and thus obviates a major cause of flow reduction found generally in liquid shutoff valves. In addition, the converging section of the flow passage assures consistent flow rate over a given interval under low liquid pressure heads. In addition, the knife-edged contact of the valve member with its seat minimizes valve malfunction caused by particle entrapment between the valve head and its seat and thus ensures long trouble-free valve operation.

It is therefore a principal object of the present invention to provide a high flow rate liquid valve having a flow passage leading from a flow port and converging in a downstream direction to a venturi-contoured outlet passage.

Another object of the invention resides in the provision of a valve unit having an inlet, a flow port having at least as great a flow area as the inlet, an outlet passage having a flow area smaller than the inlet, and a flow passage diverging from the outlet passage to the flow port.

Yet another object of the invention is directed to the provision of a valve unit of the type set forth above wherein an upstanding annular knife-edged rim defines the flow port and serves as a seat for a reciprocably movable valve head.

These and other objects of the invention will become apparent from time to time as the following specification proceeds and with reference to the accompanying drawings wherein:

FIGURE 1 is a vertical sectional view of a liquid shutoff valve constructed in accordance with the principles of this invention; and FIGURE 2 is a fragmentary view of the venturi-contoured outlet passage of the valve shown in FIGURE 1.

The valve assembly 10 illustrated in the drawing comprises a valve body 11 having a solenoid 12 mounted thereon.

The valve body 11 is a one-piece structure having a threaded inlet connecting nipple 13 leading from one side thereof and a vertically depending outlet nipple 14 extending from the base thereof. An inlet passage 15 extends through the inlet nipple 13 and opens to a chamber 16 which is hollowed out of the valve body.

A sharp upstanding annular ridge 17, lying in a horizontal plane, is formed integrally with the valve body within the hollow chamber 16 and defines a valve port 18 which constitutes the mouth of a flow passage 19 leading to an outlet passage 20 formed within the outlet nipple 14.

The flow passage 19 converges from the port 18 to the outlet passage 20 at an angle of approximately 3.5° with respect to the vertical and diverges from the restricted neck or passage 20 at an angle of about 3° with respect to the vertical through a relatively long throat 20a in the outlet nipple 14 to provide a free full flow of liquid from the port to and through the outlet. The venturi-contour of the wall of the outlet passage 19 prevents liquid from breaking away from the passage wall in its flow through the valve and thereby insures a high flow rate through the valve. Liquid flow rate is materially reduced when the liquid flowing through a conduit breaks away from the conduit wall and creates turbulence and this design obviates that problem.

A vent hole 20b is formed through the wall of the outlet nipple 14 along an axis angled downwardly somewhat from the outside to the inside of the nipple wall and opens to the restricted neck 20 to insure that the assembly will not drip after the valve has been closed.

The solenoid 12 is of a well known construction including an encapsulated coil assembly 21, an armature guide 22, which is sealed to the valve body by means of a gasket 23 and screws 24, and an armature 25 which is reciprocably mounted within the guide 22 so that upon energization of the coil the armature will move retractably within the coil. A conical compression spring 26 is interposed between the base of the guide 22 and a collar 27 on the armature to normally bias the armature to an extended position reltaive to the coil 21.

A valve head 28 is affixed to the outer, lower end of the armature 25 (and may be rockably mounted thereon by a ball and socket connection or its equivalent between the armature and the valve head) and has a flat valving surface 29 which is cooperable with the sharp annular rim 17 to control liquid flow through the port 18. The relatively sharp seating surface 17 in conjunction with the flat valving surface 29 minimizes valve malfunction such as might be caused by particle entrapment between the head 28 and the seat and insures long trouble-free valve operation. The valve head can, of course, be formed of rubber.

High flow rate capacity for the valve is achieved by forming the venturi passages with small angles of convergence and divergence preferably in the realm of 2° to 7°.

It will be observed that the minimum flow area of the port 18 is at least equal to the minimum flow area of the inlet passage 15 and that this latter passage has a flow area greater than that of the outlet passage 20. The venturi-contour of the wall 19 in conjunction with this fact assures full flow through the outlet passage 20.

It should also be understood that a stainless steel insert could be provided in the valve outlet and that the valve body could be cut out to receive the same so that the ridge 17 and the converging wall section of the outlet passage would be formed of stainless steel. The use of such material might well minimize the formation of encrustations in the outlet port and thereby assure consistent accuracy in volume dispensing over a protracted period of time.

This embodiment of the invention has been used for illustrative purposes only and various modifications and variations in the invention may be effected without departing from the spirit and scope of the novel concepts thereof.

What we claim is:

1. A liquid control valve comprising:
   a valve body having a gravity feed inlet and an outlet passage;
   a knife-edge seat defining the upstream most portion of said outlet;
   a valve member cooperable with said knife-edge to control liquid flow through said valve body; and
   a venturi-contoured flow passage in said outlet, said knife-edge seat forming the uppermost portion of the converging portion of said venturi-contoured flow passage, thereby providing a high flow rate through said outlet.

2. A liquid control valve according to claim 1, wherein said outlet includes a vent passage formed through a wall of said outlet along an axis angling in a downward direction and opening into the throat of said venturi-contoured flow passage.

3. A liquid control valve according to claim 2, wherein said venturi-contoured flow passage includes an upstream cone-shaped portion converging at an angle of 3½° with respect to the vertical and a downstream portion diverging at an angle of 3° with respect to the vertical.

References Cited

UNITED STATES PATENTS

| | | | |
|---|---|---|---|
| 816,280 | 3/1906 | Tuttle | 138—44 |
| 1,049,845 | 1/1913 | Geissinger | 251—80 |
| 2,056,807 | 10/1936 | Shanley | 137—216 X |
| 2,227,578 | 1/1941 | Fraser | 251—155 X |
| 3,034,731 | 5/1962 | Chapin | 137—216.1 X |
| 3,180,360 | 4/1965 | Pavlin | 251—118 X |

OTHER REFERENCES

Fluid Meters: Part I, The American society of Mechanical Engineers, 3rd edition, 1931, pages 24–32.

Rotovalves, by Smith, Bulletin No. 140, copyright 1939, J. Morgan Smith Co., York, Pennsylvania, pages 76 and 77.

M. CARY NELSON, *Primary Examiner.*

R. C. MILLER, *Assistant Examiner.*